March 24, 1942. G. C. CHRISTY 2,277,303
BRAKE BEAM SAFETY SUPPORT
Filed May 12, 1941 2 Sheets-Sheet 1

Inventor
George C. Christy
By Henry Fuchs
Atty.

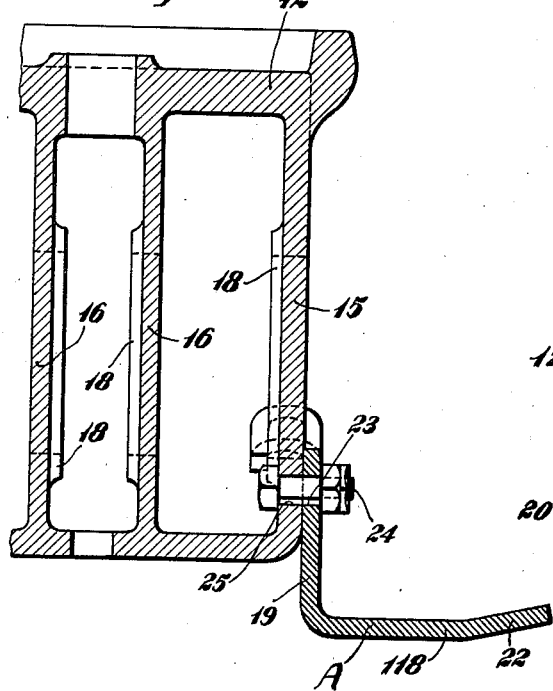
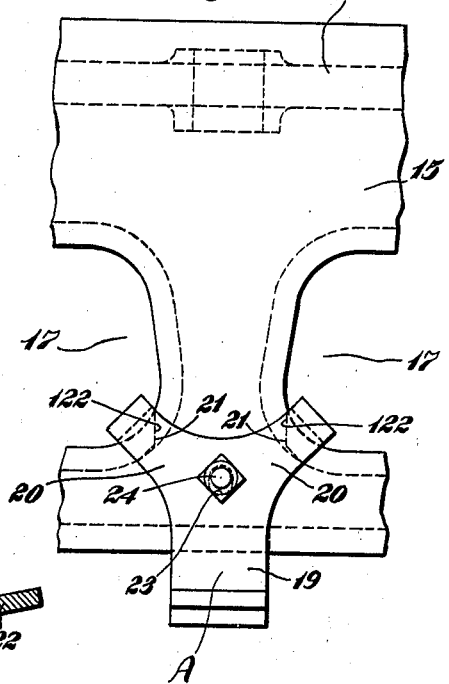
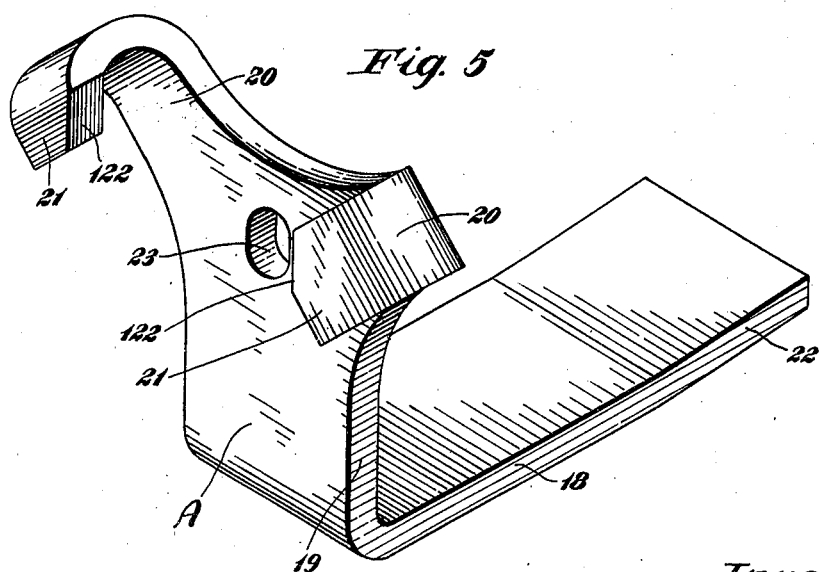

Patented Mar. 24, 1942

2,277,303

UNITED STATES PATENT OFFICE 2,277,303

BRAKE BEAM SAFETY SUPPORT

George C. Christy, Chicago, Ill.

Application May 12, 1941, Serial No. 393,079

10 Claims. (Cl. 188—210)

This invention relates to improvements in brake beam safety supports, especially for use in connection with railway cars.

One object of the invention is to provide a simple and efficient safety supporting means for brake beams, which is of rugged design and may be readily applied to the truck bolster without substantial modification of the latter.

A more specific object of the invention is to provide a brake beam safety support in the form of a bracket directly attached to the truck bolster of the car and having a supporting arm extending beneath the brake beam member, wherein the bracket has a hooked portion adapted for hooked engagement with the vertical web of the bolster at the rim portions of the usual pair of openings provided in said web at the mid-length portion of the bolster, the hooked portion extending into said openings and being engaged over portions of the web forming the rim of said openings.

A further object of the invention is to provide a safety support as specified in the preceding paragraph, wherein the hooked portion of the bracket which is attached to the bolster web is forked to provide two diverging arms, the engaging ends of which are hooked respectively within the openings of said pair to effectively anchor and brace the bracket against displacement.

Other objects of the invention will more clearly appear from the description and claims hereinafter following.

Figure 1:
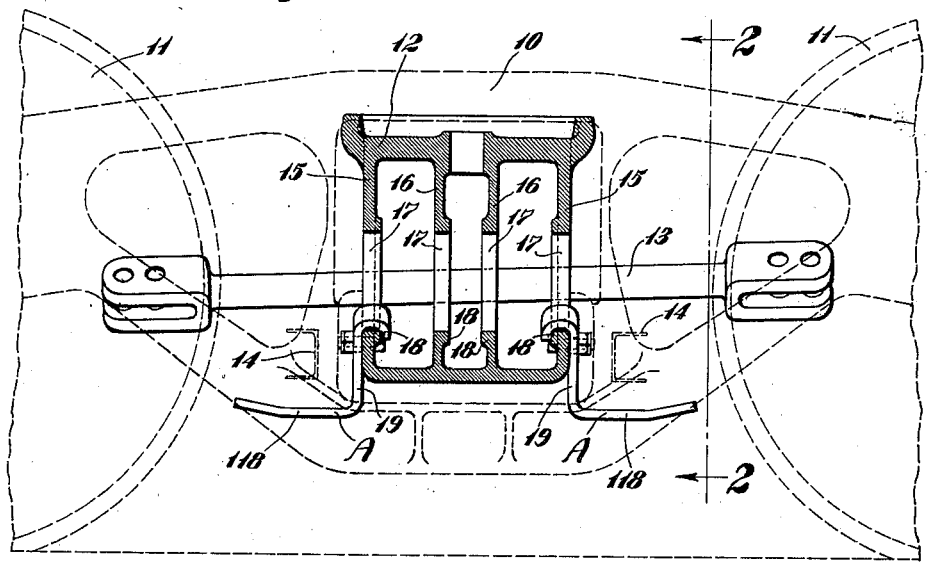
Figure 2:
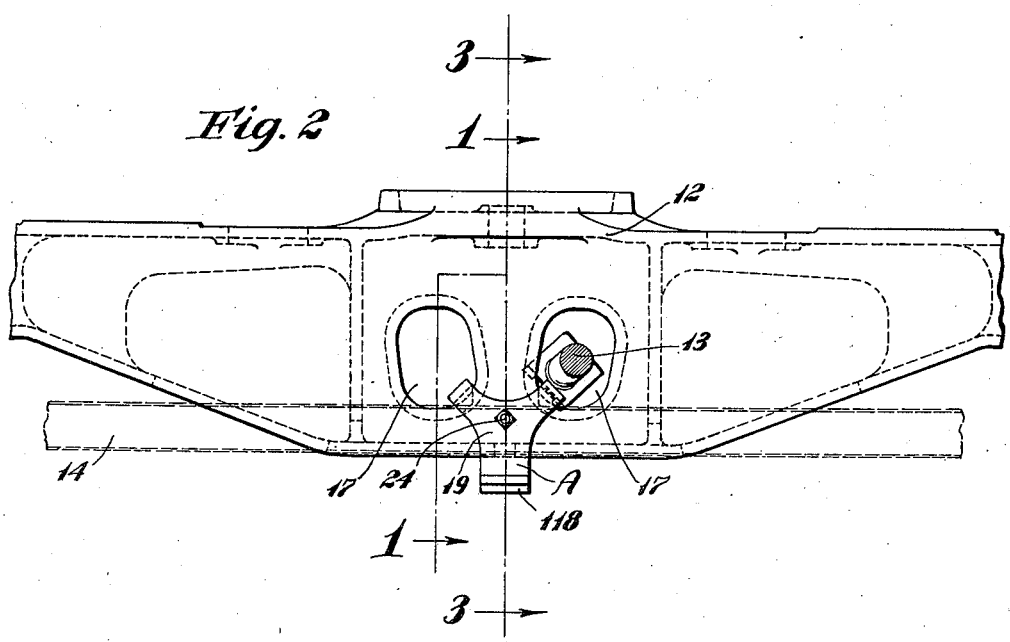

In the drawings forming a part of this specification, Figure 1 is a vertical sectional view through the truck bolster of a car, illustrating my improvements in connection therewith, the truck structure and associated parts being shown in dotted lines. Figure 2 is a transverse vertical sectional view corresponding substantially to the line 2—2 of Figure 1. Figure 3 is a vertical sectional view, on an enlarged scale, of the central portion of the truck bolster, corresponding substantially to the line 3—3 of Figure 2. Figure 4 is an elevational view of the structure shown in Figure 3, looking from right to left in said figure. Figure 5 is a detail perspective view of the safety support illustrated in Figures 1 to 4 inclusive.

In said drawings 10 designates generally the side frame member of the truck structure of a car, 11—11 the car wheels, and 12 the truck bolster. The usual truck lever connection is indicated by 13, and, as is well understood by those skilled in this art, is connected by levers and links to the brake beams of the brake rigging. The brake beams of the truck are shown in dotted lines, the same being indicated by 14—14. These beams 14—14 are disposed in the usual position at opposite sides of the bolster 12, and have the ordinary brake shoes, not shown, connected thereto which cooperate with the wheels 11—11 of the truck.

The truck illustrated is of the spring-plankless type and the bolster 12 thereof includes vertical outer webs 15—15 and spaced inner webs 16—16 between said outer webs, all of said webs being disposed substantially parallel to each other and extending in the direction of the length of the bolster. As is the standard practice, to lighten the bolster casting the webs 15—15 and 16—16 are cut out or provided with pairs of openings 17—17 at the central portion of the bolster. The rims of the openings 17—17 are usually reenforced by strengthening ribs 18—18, as shown in the drawings. The openings 17—17 are oblong in vertical direction and inclined downwardly toward each other. The adjacent upright straight rim portions of the openings of each pair are thus inclined downwardly toward each other. As shown, the corners of each opening are rounded whereby the rim sections at the adjacent corners of the pair of openings are inclined away from each other in downward direction, thus providing a wedge-shaped wall section between the openings of said pair at the lower corners thereof.

In carrying out my invention I provide a pair of brackets A—A for each truck, which may be either in the form of forgings or castings and are mounted on the bolster 12 of the truck at opposite sides of said bolster, that is, at the front and rear thereof.

Each bracket A comprises an elongated horizontally disposed outstanding flat barlike arm 118, an upstanding vertical platelike arm 19 at the inner end of the arm 118 forked at its upper portion to provide diverging sections 20—20 which have their upper extremities terminating in inwardly projecting, relatively wide barlike hooks 21—21. The inner corners of the ends of the barlike hooks 21—21 are cut away diagonally, as indicated at 122—122, to clear the inclined straight rim portions of the pair of openings in applying the bracket to the bolster.

As will be seen the arm 19 is thus of substantially Y-shape. The barlike member 118 and the vertical arm 19, together with the forked portion of the latter on which the hooks are provided, are all formed integral, and in the form of the invention illustrated the complete bracket is produced from the single elongated plate bent to shape. The outer end section of the horizontal arm 118 is preferably slightly upwardly inclined, as indicated at 22. Immediately below the forked portion thereof the upright arm 19 is provided centrally thereof with a vertically elongated bolt receiving opening 23.

When applied to the bolster of the truck, the supports A—A have the inner side faces of the vertical arms 19—19 thereof bearing flatly against the outer side faces of the outer webs 15—15 of the bolster 12 with the hooks 21—21 of the forked portion of said vertical arm of each bracket A engaged in the openings 17—17 respectively of the pair associated with the corresponding outer web 15 of the bolster, the portions 21—21 being hooked over the rims of the openings at the lower inner corners of the same, as most clearly shown in Figures 1, 2 and 4. When thus applied to the bolster of the truck, the arms 19—19 of the brackets A—A extend downwardly below the bottom side of the bolster with the arms 118—118 thereof projecting outwardly beneath the brake beams 14—14, as clearly shown in Figure 1, to underlie the latter and form emergency supports in the event that either or both brake beams become accidentally detached and drop down.

The brackets A—A are preferably secured against removal by bolts 24—24 extending through the openings 23—23 of the arms 19—19 and aligned openings 25—25 provided in the outer webs 15—15 of the bolster. The vertical elongation of each opening 23 provides for a certain amount of adjustment so that the hooks may properly engage with and seat on the sections of the rims of the openings 17—17 of each web 15 of the truck bolster at the lower ends of the adjacent sides of said two openings.

In applying the brackets A—A to the bolster, the hooks 21—21 of the forked portions are entered into the openings 17—17 of the corresponding pair well above the lower rounded corners of said openings in embracing relation to the web section between said openings, the cut away corners 122—122 of the hooks permitting the latter to clear the inclined straight rim portions of said openings. The bracket A is then dropped downwardly so that the hooks 21—21 engage over the rims of the openings at the rounded lower inner corners thereof as shown most clearly in Figures 1 and 4. The bolt 24 is then applied through the openings 23 and 25 of the bracket A and the bolster web to clamp the bracket against the bolster. As hereinbefore pointed out, the bolt merely serves to hold the bracket A in position and is not subjected to any strain when the brake beam drops onto the arm 118 of the bracket, the hooks 21—21 alone serving to support the bracket.

As will be evident from the preceding description taken in connection with the drawings, I have provided an exceeding simple and efficient emergency means for supporting the brake beams of a truck bolster in case of accidental detachment of the beams, which may be inexpensively manufactured. Further, each supporting bracket, which in itself forms a complete brake beam safety supporting means, is effectively attachable to the truck bolster without substantial modification of the latter, the provision of an opening in the web of the bolster to receive the securing bolt being the only requirement, the bolt being relieved of all strain by the bracket being securely anchored by the hooks thereof which engage the rim sections of the usual pair of openings in the web of the bolster, the hooks taking the full load and locking the bracket in position against lateral displacement and rocking by being wedged against the downwardly diverging portions of the adjacent rim sections of the two openings.

I have herein shown and described what I now consider the preferred manner of carrying out my invention, but the same is merely illustrative and I contemplate all changes and modifications that come within the scope of the claims appended hereto.

I claim:

1. In a brake beam safety support adapted for attachment to a railway car truck bolster having a pair of openings in the vertical side face thereof, the combination with a horizontal supporting arm; of an upright section from the lower end of which said arm projects, said upright section bearing against the vertical side face of the bolster; and hooks at the upper end of said upright section hooked over the rims of said openings.

2. In a brake beam safety support adapted for attachment to a railway car truck bolster having a pair of openings in the vertical side face thereof, the combination with an upright section bearing flatly against the side face of the bolster; of a pair of hook members on said upright section extending respectively into the openings of said pair in hooked engagement with the rims of said openings; and an outstanding horizontal supporting arm at the lower end of said upright section underlying the brake beam of the car truck.

3. In a brake beam safety support adapted for attachment to a railway car truck bolster having a pair of openings in the vertical side face thereof, the combination with an upright section having a forked upper end; of a hook on each member of the fork, said hooks being accommodated respectively in the openings of said pair in hooked engagement with rim portions of said openings; and a horizontally outwardly projecting supporting arm at the lower end of said upright section extending beneath the brake beam of the car truck.

4. In a brake beam safety support adapted for attachment to a railway car truck bolster having a pair of adjacent openings in the outer side web thereof, the openings having the rim portions of adjacent sides thereof rounded at their lower corners, the combination with an upright platelike section bearing against the outer side of said web, said plate section having its upper end portion forked, the extremities of the forked member being curled over into hook members, said hook members extending into said openings respectively in hooked engagement with the rim portions thereof at said lower rounded corners; of an outwardly projecting horizontal arm at the lower end of said upright plate section, said arm underlying the brake beam of the car truck.

5. In a brake beam safety support adapted for attachment to a railway car truck having a pair of openings in the vertical side face thereof, the combination with a vertical section bearing against said side face of the bolster; of hooks at the upper end of said vertical section extending into said openings in hooked engagement with the rim portions of said openings; a horizontally projecting arm at the lower end of said upright section extending into underlying relation to the brake beam of the car truck; and a clamping bolt fixed to said bolster and extending through said upright section and clamping the latter against said bolster.

6. A brake beam safety support comprising a platelike section forked at one end and having an angularly projecting arm at the other end, said forked end of the platelike section terminating in hooks.

7. A brake beam safety support comprising a platelike section forked at one end to provide diverging arms, the extremities of said arms being curled over to provide hook members, said platelike section having an angularly projecting arm at the other end adapted to underlie the brake beam of a car truck.

8. A one piece brake beam supporting member having a barlike horizontal arm adapted to underlie the brake beam, and an upstanding platelike section at the inner end of said arm, said platelike section being forked at its upper end, the arms of said fork diverging and having hooked extremities adapted to engage over a portion of the truck bolster to support said member.

9. In a brake beam safety support adapted for attachment to a body bolster of a car truck, comprising a bracket having a horizontal barlike arm, an upright barlike section formed integral with the inner end of said arm, the upper end of said platelike section being forked, the members of said forked portion diverging and having hooked extremities adapted to be anchored to the bolster, said platelike section having a bolt receiving opening below the forked portion thereof.

10. A brake beam safety support adapted for attachment to a body bolster of a car truck, comprising a Y-shaped platelike bar having the extremities of the arms of the Y hooked to anchor the support to the bolster, the outer end portion of the stem of the Y being bent at an angle to the main body portion thereof to provide an arm adapted to underlie the brake beam of a car truck.

GEORGE C. CHRISTY.